United States Patent

Shearhart

Patent Number: 5,261,163
Date of Patent: Nov. 16, 1993

[54] STEM CUTTING DEVICE

[76] Inventor: Omer D. Shearhart, 206 S. Locust St., Nowata, Okla. 74048

[21] Appl. No.: 920,836

[22] Filed: Jul. 27, 1992

[51] Int. Cl.⁵ ............................................. B26B 13/26
[52] U.S. Cl. ........................................ 30/242; 30/135; 47/1.01
[58] Field of Search ................ 56/239, 242, 243, 334, 56/335, 336, 337, 327.1; 47/1.01; 30/124, 131, 134, 135, 242; 83/167

[56] References Cited

U.S. PATENT DOCUMENTS

| | | | |
|---|---|---|---|
| 57,817 | 1/1866 | Evans et al. | 30/242 |
| 470,586 | 3/1892 | Morgan | 30/242 |
| 2,270,495 | 1/1942 | Bernay | 30/242 X |
| 2,533,962 | 12/1950 | Rowe et al. | 30/242 |
| 3,855,699 | 12/1974 | Charlett | 30/135 |
| 4,191,008 | 3/1980 | Smith | 56/327.1 |
| 4,759,174 | 7/1988 | Merritt | 56/327.1 |

FOREIGN PATENT DOCUMENTS 24669  10/1956  Fed. Rep. of Germany ........ 30/242

*Primary Examiner*—David J. Bagnell
*Attorney, Agent, or Firm*—John M. Harrison

[57] ABSTRACT

A stem cutting device for cutting the stems of roses and other plants, which includes a barrel fitted with a handle at one end and a cutting head having a slot at the opposite end, a handle lever pivotally attached to the handle and to a plunger slidably disposed in the barrel, with a blade and block combination located at the opposite end of the plunger from the handle for both cutting and retaining a stem positioned in the slot. In a preferred embodiment both the handle lever and the blade are spring-loaded to facilitate return of the handle lever, plunger, blade and block to a non-cutting configuration.

18 Claims, 1 Drawing Sheet

U.S. Patent          Nov. 16, 1993          5,261,163
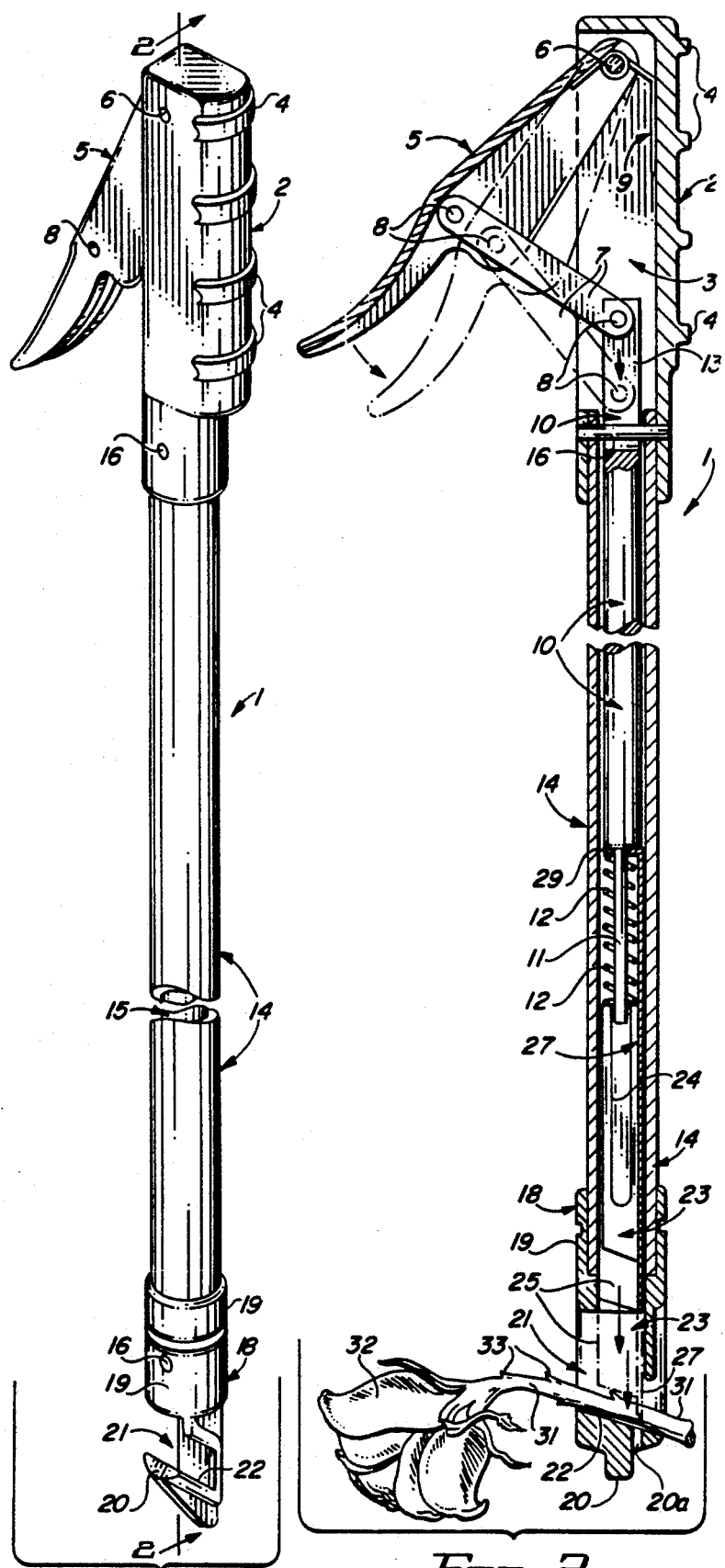
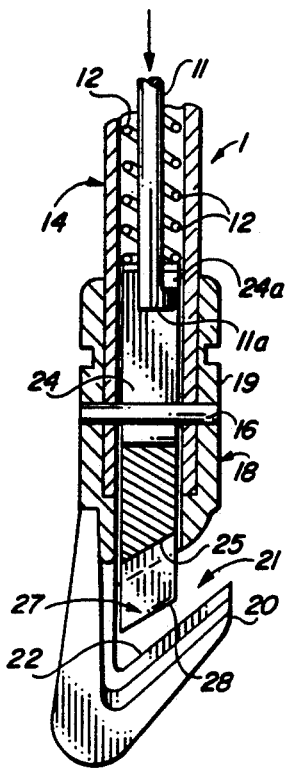
FIG-1      FIG-2      FIG-3

STEM CUTTING DEVICE

BACKGROUND OF THE INVENTION

1. Field of the Invention

This invention relates to cutting and harvesting apparatus and more particularly, to a stem cutting device for harvesting flowers such as roses, which device eliminates the need for hand contact with the stem and thorns during and after the cutting operation. The stem cutting device can also be used to harvest okra and other skin-irritating vegetables and fruits where physical contact between the fruit and/or the plant stem must be avoided. In a preferred embodiment the stem cutting device is characterized by a barrel fitted with a handle at one end and a cutting head at the opposite end, with a handle lever pivotally attached to the handle and to a plunger slidably disposed in the barrel and fitted with a blade and block combination at the cutting end of the device. The blade and block are spring-loaded inside the barrel to insure complete severing of the plant stem and the handle lever is spring-loaded in the handle to facilitate return of the handle and plunger to a non-cutting configuration when pressure is released from the handle lever. The cutting head is fitted with a stem slot for receiving the stem of a plant or flower such as a rose and the stem is severed by the blade and retained in the stem slot by operation of the block, responsive to pressure applied to the handle lever and movement of the plunger inside the barrel.

One of the problems realized in collecting certain flowers such as roses, the stems of which have thorns and the harvesting of skin-irritating vegetables such as okra, is the danger of pricking the fingers and thumb by the thorns and irritation of the skin which is characteristic of the okra plant. Furthermore, it is difficult and cumbersome to wear gloves in collecting flowers such as roses and vegetables such as okra, since the rose stems must normally be severed from the stem with a knife or other sharp instrument, thus making the collecting operation difficult. Furthermore, after severing the stem of the rose or okra plant, the severed stem and flower, as well as the okra pods, must be collected in some manner by the user.

2. Description of the Prior Art

Harvesting and collection of vegetables such as okra pods is normally accomplished by severing each pod individually with a blade and placing the pods in a basket, sack or other container which is either carried by, or strapped to the user. A typical apparatus for harvesting okra or the like is detailed in U.S. Pat. No. 4,191,008, dated Mar. 4, 1980, to Archie O. Smith. The apparatus includes an elongated frame having a handle at one end and a cutter member at the other end. A trigger is provided at the handle for remotely operating the cutter and a shroud partially surrounds the handle to protect the hand of the user during cutting. In one embodiment the cutter includes a razor blade located beneath a cylindrical guide member that retains the okra pod in position for cutting of the stem, while a pair of stabilizing ears steadies the guide member on a branch of the okra plant. In a second embodiment a rectangular guide member contains a stem-holding bracket and maintains the stem of the okra pod in proper position for cutting by a blade. A set of prongs carried by the blade pierces the pod during a cutting stroke and the pod is automatically released during retraction for disposal into a collection receptacle. Another vegetable harvesting apparatus is detailed in U.S. Pat. No. 4,759,174, dated Jul. 26, 1988, to Oswell F. Merritt. The vegetable harvesting apparatus includes a generally triangular-shaped hopper having a cutting opening, a blade slidably mounted in the hopper and a handle attached to the opposite end of the hopper from the cutting opening. A pivoting lever is mounted in the handle and a blade rod connects the upper end of the pivoting lever to the blade. The device is used by extending a vegetable such as a pod of okra through the opening in the front portion of the hopper and forcing the blade against the pod stem by manipulating the rod lever with the hand, to sever the stem and collect the okra pod in the hopper.

It is an object of this invention to provide a new and improved stem cutting device for both cutting and retaining a stem supporting a vegetable or flower.

Another object of this invention is to provide a stem cutting device which is designed to sever the stems of flowers in angular relationship to better maintain the cut flowers in a fresh condition.

Still another object of this invention is to provide a stem cutting device which is characterized by a barrel having a handle at one end and a cutting head at the opposite end, with a handle lever pivotally attached to the handle and to a plunger slidably mounted in the barrel for receiving a blade and block cutting assembly and both cutting and retaining the stem of a vegetable or flower in the cutting head of the device.

A still further object of this invention is to provide a lever-operated stem cutting device having a cutting head fitted with V-pocket or seat for receiving the stem of a vegetable, rose or other flower and a spring-loaded cutting assembly attached to one end of a plunger operated by the lever for initially cutting the stem and subsequently retaining the cut stem and vegetable or flower in the cutting head for further disposition.

Yet another object of this invention is to provide a new and improved stem cutting device which includes a barrel fitted with a lever-operated handle at one end and a cutting head at the opposite end, which lever is connected to a plunger slidably mounted in the barrel and fitted with a spring-loaded blade and block cutting assembly for severing the stem of a plant or flower on an angle, with increasing pressure exerted on the blade as the lever advances the plunger in the barrel.

SUMMARY OF THE INVENTION

These and other objects of this invention are to provide a new and improved stem cutting device which is characterized by a barrel fitted with a lever-operated handle on one end and a cutting head fitted with a stem slot on the other end, a plunger slidably mounted in the barrel and having one end pivotally attached to the lever and the other end fitted with a spring-loaded blade and block cutting and holding assembly, such that the plunger is slidably displaced in the barrel responsive to pressure applied to the lever to advance the cutting and holding assembly against the stem of a flower or vegetable placed in the cutting head and further advancement of the lever causes the blade to sever the stem and extend through a slot in the cutting head as the block engages the stem and presses the stem against the cutting head to retain the stem and flower or vegetable in the stem cutting device.

BRIEF DESCRIPTION OF THE DRAWING

The invention will be better understood by reference to the accompanying drawing, wherein:

FIG. 1 is a perspective view, partially in section, of a preferred embodiment of the stem cutting device of this invention;

FIG. 2 is a sectional view taken along line 2—2 of the stem cutting device illustrated in FIG. 1; and FIG. 3 is a sectional, enlarged view of the cutting head and cutting and holding elements of the stem cutting device illustrated in FIGS. 1 and 2.

DESCRIPTION OF THE PREFERRED EMBODIMENTS

Referring initially to FIGS. 1 and 2 of the drawing, a preferred embodiment of the stem cutting device of this invention is generally illustrated by reference numeral 1. The stem cutting device 1 is characterized by a handle 2, fitted with a longitudinal handle recess 3 for receiving one end of a handle lever 5, which is pivotally attached to the top portion of the handle 2 in the handle recess 3, by means of a lever pivot pin 6. One end of a link 7 is pivotally attached to the handle lever 5 in spaced relationship with respect to the lever pivot pin 6 by a first link pin 8 and the opposite end of the link 7 is pivotally secured to one end of a plunger 10 at the upper end of a plunger slot 13, by means of a second link pin 8. A lever spring 9 has one leg engaging the handle 2 and the other leg seated against the handle lever 5, to bias the extending end of the handle lever 5 outwardly of the handle recess 3, as illustrated in FIG. 2. Spaced handle grips 4 are also provided on the handle 2 for gripping purposes. One end of a barrel 14 is secured to the bottom end of the handle 2 by means of a barrel mount pin 16, which extends through the handle 2, barrel 14 and the plunger slot 13 of the plunger 10, to facilitate sliding movement of the plunger 10 within the barrel 14. A plunger pin 11 projects longitudinally from the opposite end of the plunger 10 and receives a plunger spring 12 which is seated in the barrel bore 15 of the barrel 14, adjacent to the opposite end of the plunger 10, as further illustrated in FIG. 2. The extending end of the plunger pin 11 is fitted with a laterally-projecting pin flange 11a, and a rectangular block 23, having a block slot 24 which defines a slot shoulder 24a, seated on the pin flange 11a of the plunger pin 11, is further illustrated in FIGS. 2 and 3. The opposite end of the block 23 is shaped to define a double block bevel 25 which matches the corresponding dual finger bevel 22 provided in a J-shaped retaining finger 20 of the cutting head 18. The finger 20 projects from a head collar 19, mounted on the opposite end of the barrel 14 by means of a barrel mount pin 16, which extends through the block slot 24 of the block 23. A finger slot 20a is also provided in the retaining finger 20 and a stem slot 21 separates the retaining finger 20 from the collar portion of the cutting head 18.

Referring again to FIGS. 2 and 3 of the drawing, an L-shaped blade 27 is provided with a blade bevel 28 at the extending end and a blade flange 29, which is mounted on the plunger pin 11 of the plunger 10 at the top of the plunger spring 12 and is seated against the opposite end of the plunger 10 by the bias in the plunger spring 12. Accordingly, the flat portion of the blade 27 which extends downwardly from the blade flange 29 traverses the length of the plunger spring 12 and the block 23 and terminates at the block bevel 25 of the block 23, as illustrated in FIG. 2. In a preferred embodiment of the invention the blade bevel 28 of the blade 27 substantially matches the block bevel 25 inclination of the block 23 and is longitudinally aligned with the finger slot 20a of the retaining finger 20.

In operation, and referring again to FIGS. 2 and 3 of the drawing, when the handle lever 5 is in the outwardly-extended position illustrated in FIG. 2 by operation of the lever spring 9, the slotted end of the plunger 10 is projected into the handle recess 3 of the handle 2 to retract the blade 27 and block 23 in concert from the stem slot 21, into the head collar 19 of the cutting head 18. Accordingly, both the blade 27 and the block 23 are then clear of the stem slot 21 defined by the retaining finger 20 and the head collar 19 of the cutting head 18. The stem 31 of a flower 32 is then inserted in the stem slot 21, with the flower 32 projecting from the stem slot 21 on the block 23 side of the cutting head 18, as illustrated in FIG. 2. Pressure exerted on the handle lever 5 in the direction of the arrow illustrated in FIG. 2 moves the handle lever 5 into the position illustrated in phantom and causes the plunger 10 to slide inside the barrel 14 responsive to the operation of the link 7, as the link 7 also pivots into the phantom position. This action forces the blade 27 and block 23 downwardly in concert from the head collar 19 into the stem slot 21, until the block 23 and blade 27 contact the stem 31. Further advancement of the handle lever 5 in the direction indicated by the arrow in FIG. 2 causes the blade 27 to sever the stem 31 as the block 23 forces that portion of the stem 31 which is attached to the flower 32 tightly against the finger bevel 22 of the retaining finger 20. Movement of the blade 27 completely through the stem 31 occurs as the plunger 10 continues its downward travel against the bias of the plunger spring 12, since the plunger spring 12 is compressed between the upper end of the block 23 and the lower end of the plunger 10 at the base of the plunger pin 11. Accordingly, incremental compression of the plunger spring 12 responsive to additional pressure on the handle lever 5 increases the pressure on the blade 27, which cleanly severs the stem 31 at an angle as the cutting end or blade bevel 28 of the blade 27 registers with the correspondingly shaped finger slot 20a, provided in the retaining finger 20. That portion of the stem 31 which is connected to the plant is then freed from engagement with the cutting head 18, while that portion of the stem 31 which supports the flower 32 is retained in the stem slot 21 due to the bias of the plunger spring 12, which forces the block 23 against the stem 31. The stem cutting device 1 can then be manipulated to locate the stem 31 and flower 32 to any desired location without the necessity of touching the stem 31, thereby avoiding the thorns 33.

Referring again to FIG. 3 of the drawing, it will be appreciated by those skilled in the art that slidable movement of the block 23 inside the head collar 19 of the cutting head 18 is facilitated in the cutting mode by compression of the plunger spring 12 and in the retraction mode by engagement of the pin flange 11a on the plunger pin 11 with the slot shoulder 24a of the block slot 24 in the block 23. This travel of the block 23 in the barrel bore 15 is also facilitated by extending the bottom barrel mount pin 16 through matching holes drilled in the head collar 19 and the barrel 14 and through the block slot 24, provided in the block 23. Accordingly, the block 23 is constrained to move upwardly and downwardly inside the head collar 19 within the allowable "throw" or movement of the handle lever 5, as the stem slot 21 accommodates the bottom barrel mount pin 16.

It will be further appreciated by those skilled in the art that the stem cutting device 1 of this invention can be utilized to cut the stem of substantially any plant, including decorative flowering plants such as roses, as well as vegetable-producing plants such as okra and the like, in non-exclusive particular. The stem cutting device 1 may be utilized under any circumstances where it is undesirable to touch the stem of the plant being cut and where harvesting can be accomplished using only the stem cutting device 1 without the necessity of handling either the stem or the plant harvested. In a most preferred embodiment of the invention the stem cutting device 1 is constructed of aluminum, although alternative materials of construction such as plastics like polyvinylchloride and other plastics known to those skilled in the art, may also be utilized.

Referring again to FIGS. 1 and 2 of the drawings, in a most preferred embodiment of the invention the dual direction finger bevel 22 is provided in the J-shaped retaining finger 20 to facilitate seating and severing of the stem 31 at an angle, an expedient which produces a bevelled cut in the stem and supplies a larger "wicking" area for migration of water through the stem 31 to the flower 32 to maintain the flower 32 in a fresh condition for a longer period of time. Furthermore, the acute angle in the retaining finger 20 produces a V-shaped receptacle that forces the stem 31 into a secure position for severing by the blade 27 when operating the handle lever 5.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A stem cutting device comprising a handle; actuating means carried by said handle in movable relationship; an elongated barrel having one end fixedly carried by said handle; cutting head means fixedly carried by the opposite end of said barrel; and a plunger slidably disposed in said barrel; a plunger pin extending longitudinally from the opposite end of said plunger; a blade located in said barrel in substantially parallel relationship with respect to said plunger pin, a blade flange terminating one end of said blade and seated on said opposite end of said plunger and a blade bevel provided on the opposite cutting end of said blade; a plunger spring disposed on said plunger pin and seated against said blade flange for securing said blade flange on said opposite end of said plunger and mounting said blade in said barrel; block means disposed in said barrel alongside said blade, with one end of said block means carried by said plunger pin and a longitudinal opening provided in said block means in longitudinal alignment with said plunger pin, whereby said manipulation of said actuating means slidably extends said plunger, said plunger pin, said blade and said block means in said barrel until said block means contacts the stem and said blade severs the stem in said cutting head means and further extension of said plunger projects said plunger pin into said longitudinal opening in said block means and extends said blade through the stem against the bias of said plunger spring, to completely sever the stem and retain the severed stem in said cutting head means.

2. The stem cutting device of claim 1 wherein said actuating means further comprises a lever having one end pivotally carried by said handle and further comprising link means pivotally connected to said lever and said plunger and lever bias means engaging said one end of said lever and said handle for biasing the opposite end of said lever outwardly of said handle.

3. The stem cutting device of claim 1 wherein said cutting head means further comprises a generally J-shaped cutting head having a head collar attached to said opposite end of said barrel; a bevelled retaining finger extending from said head collar and a finger slot provided in said bevelled retaining finger, said bevelled retaining finger spaced from said head collar to define a stem slot for receiving the stem, whereby said blade means traverses said stem slot and enters said finger slot for cutting and retaining the stem in said stem slot responsive to said manipulation of said actuating means.

4. The stem cutting device of claim 1 wherein said cutting head means further comprises a generally J-shaped cutting head having a head collar attached to said opposite end of said barrel, a bevelled retaining finger extending from said head collar and a finger slot provided in said bevelled retaining finger, said bevelled retaining finger spaced from said head collar to define a stem slot for receiving the stem, whereby said blade and said block means traverse said stem slot and said blade enters said finger slot for cutting and retaining the stem in said stem slot responsive to operation of said actuating means.

5. The stem cutting device of claim 4 wherein said actuating means further comprises a lever having one end pivotally carried by said handle and further comprising link means pivotally connected to said lever and said plunger and lever bias means engaging said one end of said lever and said handle for biasing the opposite end of said lever outwardly of said handle.

6. The stem cutting device of claim 5 wherein said block means further comprises an elongated block having a block bevel substantially matching said bevelled retaining finger for releasably securing the stem between said block bevel and said bevelled retaining finger.

7. The stem cutting device of claim 6 wherein said lever bias means further comprises a spring.

8. A stem cutting device for cutting and retaining the stem of a plant, comprising a handle; a lever having one end pivotally carried by said handle and the other end of said lever free to pivot with respect to said handle; a barrel extending from said handle in fixed relationship; a plunger slidably disposed in said barrel and a plunger pin projecting from one end of said plunger; a link having one end pivotally connected to said lever and the opposite end of said link pivotally connected to the opposite end of said plunger, for causing said plunger to be slidably displaced in said barrel responsive to operation of said handle; a coil spring disposed on said plunger pin, with one end of said coil spring seated against said one end of said plunger; a blade located inside said barrel in substantially parallel relationship with respect to said plunger pin, a blade flange terminating one end of said blade and positioned between said one end of said plunger and said one end of said coil spring and a blade bevel provided on the opposite cutting end of said blade, said one end of said coil spring biasing said blade flange against said one end of said plunger for retaining said blade in cutting configuration in said barrel; an elongated block disposed in said barrel, a longitudinal slot provided in said block and a slot shoulder provided in said longitudinal slot for removably engaging said plunger pin; a generally J-shaped cutting head having a head collar fixedly attached to said opposite end of said barrel, a bevelled retaining finger extending from said head collar and a finger slot provided in said bevelled retaining finger, said retaining finger spaced from said head collar to define a stem slot for receiving the stem, whereby said blade and said elongated block traverse said stem slot for cutting and retaining the stem in said stem slot responsive to operation of said lever.

9. The stem cutting device of claim 8 further comprising lever bias means engaging said lever and said handle for biasing said other end of said lever away from said handle.

10. The stem cutting device of claim 9 further comprising a pin flange provided on said plunger pin for engaging said slot shoulder in said longitudinal slot of said block and retracting said block in said head collar and said barrel, responsive to release of said lever.

11. The stem cutting device of claim 10 further comprising a first mount pin extending through said handle and said barrel for mounting said handle on said barrel and a longitudinal plunger slot provided in said opposite end of said plunger for receiving said first mount pin and said link.

12. The stem cutting device of claim 8 further comprising a first mount pin extending through said handle and said barrel for mounting said handle on said barrel and a longitudinal plunger slot provided in said opposite end of said plunger for receiving said first mount pin and said link.

13. The stem cutting device of claim 8 further comprising:
   (a) lever bias means engaging said lever and said handle for biasing said other end of said lever away from said handle; and
   (b) a first mount pin extending through said handle and said barrel for mounting said handle on said barrel and a longitudinal plunger slot provided in said opposite end of said plunger for receiving said first mount pin and said link.

14. A stem cutting device for simultaneously cutting and retaining the stem of a plant, comprising a handle; a lever having one end pivotally carried by said handle and the other end of said lever free to pivot with respect to said handle; a barrel extending from said handle in fixed relationship, said barrel having a barrel bore; a plunger slidably disposed in said barrel bore, a plunger pin projecting from one end of said plunger and a pin flange provided on the projecting end of said plunger pin; a link having one end pivotally connected to said lever and the opposite end of said link pivotally connected to the opposite end of said plunger, for causing said plunger to be slidably displaced in said barrel bore responsive to operation of said handle; a coil spring disposed on said plunger pin, with one end of said coil spring seated against said one end of said plunger; a blade located inside said barrel bore in substantially parallel relationship with respect to said plunger pin, a blade flange terminating one end of said blade and positioned between said one end of said plunger and said one end of said coil spring and a blade bevel provided on the opposite cutting end of said blade, said one end of said coil spring biasing said blade flange against said one end of said plunger for retaining said blade in cutting configuration in said barrel bore; an elongated block disposed in said barrel bore, a longitudinal slot provided in said block and a slot shoulder provided in said longitudinal slot for removably receiving said pin flange of said plunger pin; a generally J-shaped cutting head having a head collar fixedly attached to said opposite end of said barrel, a bevelled retaining finger extending from said head collar and a finger slot provided in said bevelled retaining finger, said retaining finger spaced from said head collar to define a stem slot for receiving the stem, whereby said blade and said elongated block traverse said stem slot for cutting and retaining the stem in said stem slot responsive to operation of said lever.

15. The stem cutting device of claim 14 further comprising lever bias means engaging said lever and said handle for biasing said other end of said lever away from said handle.

16. The stem cutting device of claim 14 further comprising a first mount pin extending through said handle and said barrel for mounting said handle on said barrel and a longitudinal plunger slot provided in said opposite end of said plunger for receiving said first mount pin and said link.

17. The stem cutting device of claim 14 further comprising:
   (a) lever bias means engaging said lever and said handle for biasing said other end of said lever away from said handle; and
   (b) a first mount pin extending through said handle and said barrel for mounting said handle on said barrel and a longitudinal plunger slot provided in said opposite end of said plunger for receiving said first mount pin and said link.

18. The stem cutting device of claim 17 further comprising a second mount pin extending through said head collar of said cutting head and said barrel for mounting said cutting head on said opposite end of said barrel, said second mount pin also extending through said longitudinal slot in said block.

* * * * *